United States Patent [19]

Shu

[11] Patent Number: 5,568,572

[45] Date of Patent: Oct. 22, 1996

[54] METHOD AND APPARATUS FOR TONAL CORRECTION IN BINARY PRINTING DEVICES BY PREDISTORTION OF IMAGE DATA

[75] Inventor: Joseph S. Shu, San Jose, Calif.

[73] Assignee: Seiko Epson Corporation, Tokyo, Japan

[21] Appl. No.: 269,601

[22] Filed: Jul. 1, 1994

[51] Int. Cl.$^6$ ....................................................... G06K 9/40
[52] U.S. Cl. ........................... 382/260; 382/274; 358/448
[58] Field of Search ...................................... 382/270, 205, 382/272, 273, 263, 264, 260, 274; 358/298, 456, 468, 448, 455, 461

[56] References Cited

U.S. PATENT DOCUMENTS

| | | | |
|---|---|---|---|
| 4,196,451 | 4/1980 | Pellar | 358/459 |
| 4,562,486 | 12/1985 | Suzuki et al. | 358/464 |
| 4,772,911 | 9/1988 | Sasaki et al. | 347/15 |
| 5,050,000 | 9/1991 | Ng | 358/298 |
| 5,051,844 | 9/1991 | Sullivan | 358/456 |
| 5,070,413 | 12/1991 | Sullivan et al. | 358/456 |
| 5,077,615 | 12/1991 | Tsuji | 358/298 |
| 5,081,528 | 1/1992 | Hayashi et al. | 358/501 |
| 5,109,282 | 4/1992 | Peli | 358/298 |
| 5,146,346 | 9/1992 | Knoll | 358/298 |
| 5,208,684 | 5/1993 | Itoh | 358/456 |
| 5,285,220 | 2/1994 | Suzuki et al. | 347/14 |
| 5,291,311 | 3/1994 | Miller | 358/456 |
| 5,293,430 | 3/1994 | Shiau et al. | 382/173 |
| 5,307,426 | 4/1994 | Kanno et al. | 382/252 |
| 5,309,526 | 5/1994 | Pappas et al. | 382/237 |
| 5,311,332 | 5/1994 | Imao et al. | 358/518 |
| 5,313,287 | 5/1994 | Barton | 358/458 |
| 5,315,381 | 5/1994 | Yamashita et al. | 358/510 |

OTHER PUBLICATIONS

Rosenberg, "Measurement-based Evaluation of a Printer Dot Model For Halftone Algorithm Tone Correction," 2(3) *Journal of Electronic Imaging* 205 (1993).

Trontelj et al., "Optimal Halftoning Algorithm Depends on Printing Resolution," *SID 92 Digest* 749 (1992).

*Primary Examiner*—Joseph Mancuso
*Assistant Examiner*—Jayanti K. Patel
*Attorney, Agent, or Firm*—Eric B. Janofsky

[57] ABSTRACT

Disclosed are printing methods and apparatus that process image source data into printed output visually superior to that obtained by conventional predistortion. In accordance with a first aspect of the invention, multibit source data representing the density variations of an original or source image is modified by a filter function. The filtered data is then processed by a halftoning routine that converts the data into a raster of single-bit data suitable for transfer to a printing device. The raster data specifies a density pattern lighter than that of the source image in highlight and upper midtone regions and darker than that of the source image in shadow and lower midtone regions. In accordance with a second aspect of the invention, an analogous filter is applied to parameters associated with the halftone processing algorithm rather than to the source data.

26 Claims, 4 Drawing Sheets

METHOD AND APPARATUS FOR TONAL CORRECTION IN BINARY PRINTING DEVICES BY PREDISTORTION OF IMAGE DATA

RELATED APPLICATIONS

The following applications of Joseph S. Shu, filed contemporaneously herewith and assigned to the assignee of the instant application, contain subject matter related to this application: METHOD AND APPARATUS FOR MINIMIZING ARTIFACTS IN IMAGES PRODUCED BY ERROR DIFFUSION HALFTONING and IMPROVED METHOD AND APPARATUS FOR DITHER ARRAY GENERATION TO REDUCE ARTIFACTS IN HALFTONED IMAGES.

BACKGROUND OF THE INVENTION

1. Field of the Invention

The present invention relates digital printing devices and computer systems that utilize such devices, and in particular to techniques for reducing errors in tonal rendition produced by such devices.

2. Description of the Related Art

Most computer-driven printing devices, such as laser, dot-matrix and ink-jet printers, print in a binary fashion: the output medium is divided into an array of picture elements, or "pixels," and the devices can either print a small colored dot at each pixel location or leave the location blank. In the case of monochrome printers, all of the dots are printed in a single color, whereas color printers select a dot color from a small set of colors.

Pictorial imagery, by contrast, is continuous in tonality, exhibiting a "gray scale" that extends over a large range of tonal levels. If such a "continuous-tone" image is divided into pixels, each will exhibit a gray-scale tone. In order to reproduce the image by means of an electronic printing device capable of applying only a single-toned dot, these gray-scale tones must be converted into a binary format. The conversion process, which may take many forms, is generically referred to as "halftoning." Although a halftone image consists solely of a spatial arrangement of binary colored or uncolored dots, the human visual system integrates this pattern to create an illusion of a continuous-tone original.

During the printing process, the image to be printed is divided into a series of pixels, and the tonal value of the image at each pixel is quantized as a multibit digital word. The pixels are provided as a stream of digital words to the printer, which processes, or halftones the words into a "raster" of binary values. Numerous electronic halftoning algorithms have been developed and refined over the years. In their simplest form, such algorithms compare an input intensity level with a threshold level, and generate a binary output pixel value depending the relative values.

For example, a digital scanner processing a continuous-tone image might represent detected light intensities as multibit signals; the numerical value of these signals frequently ranges from 0 to 255, corresponding to a 256-level gray scale. The halftoning process compares the scanner output signals with a periodically repeated array of threshold "screen" values to produce the requisite binary pixels. In such a system, the 8-bit input signals have effectively been compressed into a grid of single-valued elements.

Naturally, such compression implies significant loss of information. Additional techniques have therefore been developed to reduce the visual distortions created by the halftoning process. One approach, known as error diffusion, distributes the "quantization error" (i.e., the difference between the input tonal value represented by a multibit word and the output value represented by a single bit) proportionally among neighboring pixels. Quantization error occurs wherever the original image contains gray values; in an 8-bit gray scale, for example, such error is absent only at signal levels of 0 or 255.

In general, error diffusion produces an excellent image reproduction, but also creates well-known artifacts called "worms" and "snowplowing" which degrade image quality. Various attempts have been made to reduce artifact patterns; these have generally been only partially successful, as the patterns are not totally removed, but instead are changed in appearance or orientation in a manner that is more pleasing to the eye.

Another problem inherent in the error-diffusion method is the large number of computations necessary to process an image. Since several computations, including multiplications, must be performed on each processed pixel, millions of computations may be necessary to generate the final output values for a typical high-resolution image. In addition, it is necessary to store at least one line of error values that are to be applied to the succeeding line of image values. This large number of computations and the required storage combine to increase the processing time for each image, resulting in decreased printer throughput.

As a result, alternatives to error diffusion have been developed to reduce the number of computations necessary to process an image. One such alternative is called "ordered dithering," in which an array of predetermined (and generally different) threshold values—a "dither array"—with the same spacing as the image pixels is conceptually overlaid onto the image pixel array. If the dither array is smaller than the image array, then the dither array is repeated side-by-side or "tiled" over the image array to produce a repetitive pattern. Each pixel thus has two values conceptually associated with it, namely, the actual pixel tonal value and the threshold value of the overlaid dither array cell to which it is compared. Equivalently, the values in the dither array can be added to the tonal value of each pixel, and the augmented value compared with a fixed threshold. In either case, an output value is generated based on the comparison. Since the processing of each pixel involves only a simple comparison and is independent of neighboring pixel values, the computation time required to process an entire image is substantially less than that required for error diffusion.

However, the quality of the resulting processed image depends entirely on the threshold values chosen for the dither array. Two types of dither arrays are commonly used. In a "clustered-dot" dither array, the threshold values are organized into small groups having closely spaced values. These clusters mimic "dots" of various sizes, and thus produce processed images visually similar to those produced by the traditional halftone screen used for many years in photoengraving processes.

In "dispersed-dot" dithering, large and small threshold values are spread even throughout the array. This technique enhances the printable gray scale as well as resolution. For image-reproduction devices capable of clearly displaying a single isolated pixel, the dispersed-dot dither array usually produces better image quality than the clustered-dot dither array; this is because dispersed-dot arrays achieve better high-frequency fidelity and create a better illusion of a continuous gray region than do clustered-dot arrays of the same resolution and period.

With both types of arrays, a tradeoff generally exists between the number of discrete gray levels that can be represented (which increases as the number of dither-array elements or cells increases) and the appearance of annoying low-frequency geometric patterns in areas of uniform gray (which also appear as the number of dither-array elements increases). Increasing the size of the dither array also tends to decrease image resolution as low-frequency values disappear. One way to reduce these patterns while retaining resolution is to make the size of the dither array very large and utilize homogeneous patterns of threshold values, where successive threshold values "turn on" pixels in a homogeneous, random pattern. However, as the array size increase, assigning threshold values to the array cells to produce the necessary pattern becomes a nontrivial matter. Accordingly, various schemes have been developed to derive random value sequences and assign them to the array cells.

All digital halftoning techniques assume perfectly square pixels, which fully cover the printable area of the recording medium. If this were truly the case, the printer output density would be directly proportional to the input (scanned) density of the original; the ideal case, as indicated by the 45° line in FIG. 1, occurs when output density precisely matches input density. In fact, however, the response of real electronic printing devices is typically nonlinear because such devices do not generate perfectly adjacent, nonoverlapping square dots; instead, they tend to produce dots that are more round than square, and which extend beyond the square boundaries of ideal pixels. This is necessary to ensure that adjacent dots fully overlap without leaving uncolored space (so that, for example, fully colored fields are printed solidly, without uncolored gaps) under a variety of printing conditions. Because the dots are larger than what is assumed in the halftoning algorithm, a plot of printer output density (expressed in terms of normalized percentage dot area) as a function of input gray-scale density—with larger values along the axes corresponding to lower density values, so that the maximum density occurs at the origin—ordinarily follows a curve similar to $f(x)$ in FIG. 1; the printed image, accordingly, appears darker than it should. The precise form of $f(x)$ is determined both by characteristics of the printer and the selected halftoning algorithm.

To compensate for this effect, the function $f(x)$ is defined mathematically through piecewise density measurements and regression, and an inverse (transfer) function, $f^{-1}(x)$, defined as well. The latter function, when applied to incoming source data, offsets the effects of the printer function, correcting the data so that processing by the halftoning algorithm will produce a printed output whose density characteristics more closely match that of the original.

Although this technique, known as "predistortion," produces printed output superior to unmodified halftoned image data, correction to the ideal linear response does not necessarily produce the most visually desirable printed copy. This is due to the complex interactions between the human visual system and the patterns produced by halftoning algorithms on a variety of scales. Subjective responses frequently vary with both the halftoning algorithm employed and the degree of predistortion. See, e.g., Trontelj et al., "Optimal Halftoning Algorithm Depends on Printing Resolution," SID 92 Digest at 749 (1992). The present invention is directed toward improving predistortion to enhance the visual appearance of printed output.

DESCRIPTION OF THE INVENTION

BRIEF SUMMARY OF THE INVENTION

I have found that, contrary to conventional practice, applying certain kinds of nonlinear predistortion to incoming source data can produce printer output which is visually preferable to that produced by linear predistortion (i.e., predistortion that results in output whose density pattern closely matches or is linearly related to the input density pattern).

In accordance with a first aspect of the invention, multibit source data representing the density variations of an original or source image is modified by a filter function. The filtered data is then processed by a halftoning module that converts the data into a raster of single-bit data suitable for transfer to a printing device. Instead of conforming linearly to the input source data, the raster data specifies a density pattern lighter than that of the source image in highlight and upper midtone regions, and darker than that of the source image in shadow and lower midtone regions.

In accordance with a second aspect of the invention, the filter is applied to parameters associated with the halftone processing algorithm rather than to the source data. For example, in a dithering scheme that utilizes an array of threshold values, the filter function can be applied to these values such that, when the filtered values are applied in an inverse fashion to source data to produce the raster pattern, that pattern is weighted according to the desired nonlinear output function. This approach can generate considerable savings in processing load, since a single dither array is modified just once but is applied repeatedly to the source data. Using, for example, a 64×64 dither array, application of the filter function to each cell requires processing of 4,096 data values; by contrast, assuming a sampling density of 720×720 dots per inch for the source image, applying the filter function to each source-data value would require processing of over 40 million data points for each 8"×10" document.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
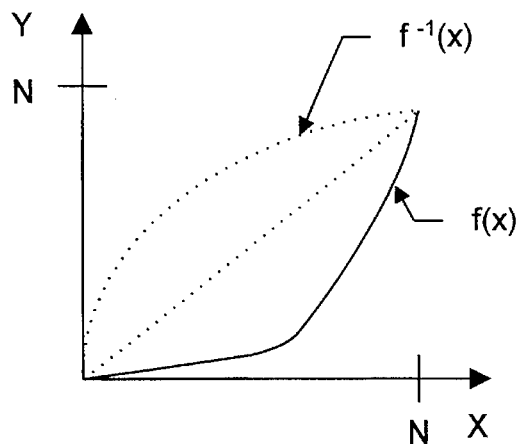
FIG. 1 graphically illustrates how the output of electronic printers tends to deviate, in terms of density level, from a source continuous-tone image, and how this deviation is corrected in the prior art.
Figure 2A:
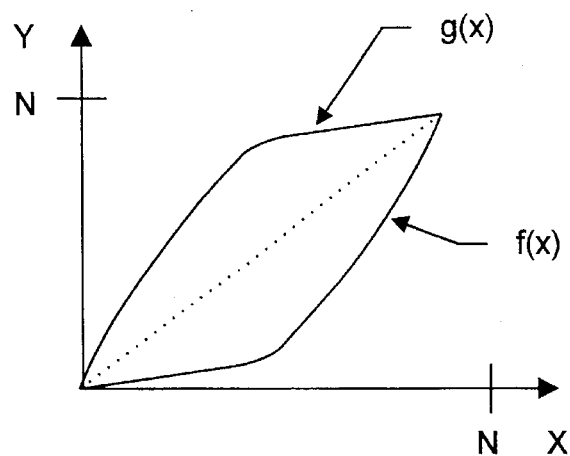
FIGS. 2A and 2B graphically illustrate derivation of a parameterized family of transfer functions in accordance with the present invention, and the resulting printer outputs.
Figure 2B:
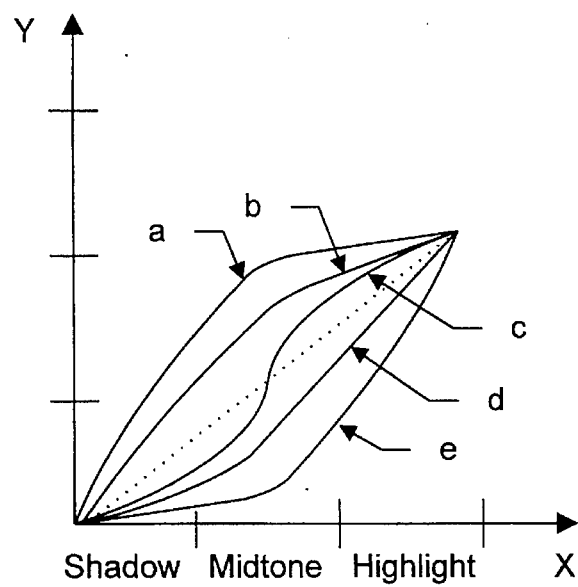

Refer first to FIGS. 2A and 2B, which illustrate operation of the first aspect of the invention. Instead of processing source data in accordance with a transfer function $f^{-1}(x)$, which produces the linear response shown in FIG. 1, I utilize a different form of function $g(x)$, a representative version of which appears in FIG. 2A. This function, when applied to source data, modifies it such that halftone processing will produce a raster whose final printed appearance exhibits the density variations shown as $h(x)=f(g(x))$ in FIG. 2B (since the printer function $f(x)$ operates not on source data x, but on data that has been predistorted by $g(x)$). Specifically, the highlight and upper midtone regions will be rendered at a lighter density than the corresponding regions of the source image, while the shadow and lower midtone regions are rendered at a darker density.

Suitable transform functions to implement this aspect of the invention are most conveniently based on the printer function $f(x)$, which, it will be recalled, relates the density of incoming source data to the density at which it will actually be rendered on the printer. A preferred transform function $g(x)$ is:

$$g(x)=N-f(N-x)$$

where x is the density of a source data point expressed as a numerical value; N is the highest numerically expressed gray-scale density at which the source data is represented (e.g., in an 8-bit gray scale, N=255), corresponding to zero print density; and f is the printer function.

It is also possible to parameterize the function $g(x)$ in order to obtain a family of transform curves that offer the user greater control over output (i.e., the appearance of the final image in accordance with $h(x)$). Such control may be necessary to achieve visually optimal output over a variety of printing conditions, halftone-processing algorithms and image types, given the complex relationship between actual density patterns and visual perception thereof. Preferably, the function $g(x)$ is parameterized using a weighting factor w, so that the family of available functions is:

$$g(x)=2w[N-f(N-x)-x]+x$$

where $0<w<1$. As shown in FIG. 2B, the result is a family of curves. Curve c illustrates the case $w=0.5$, so that $h(x)=f(g(x))$ as discussed previously. Curve a corresponds to $w=1$, which produces an output $h(x)$ equivalent to the $g(x)$ function; curve e corresponds to the opposite case, where $w=0$, producing an output corresponding to an unmodified $f(x)$; and curves b and d represent intermediate cases.

Figure 4:
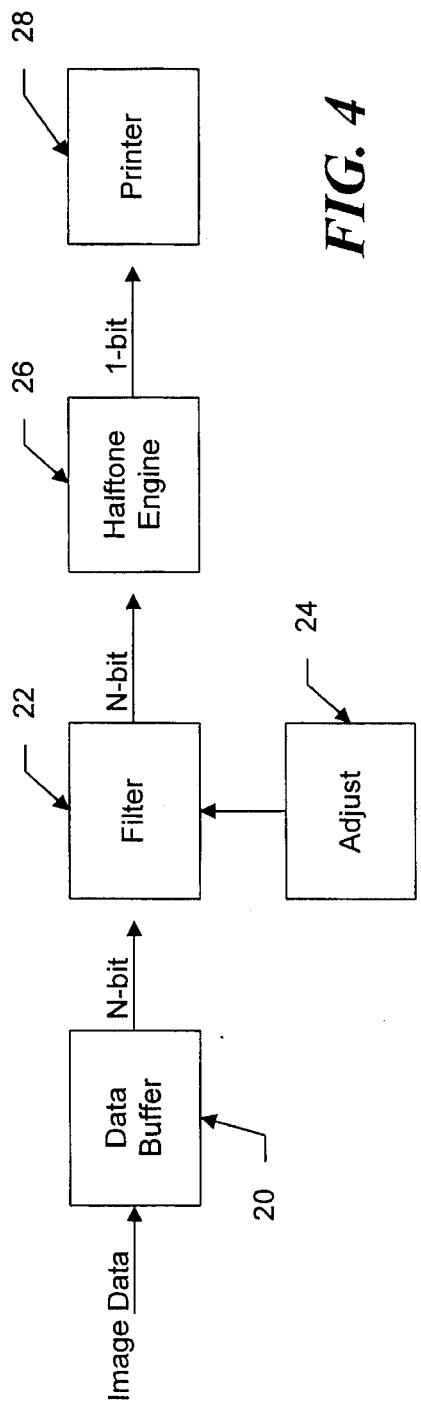
FIG. 4 illustrates, in block-diagram form, a preferred hardware implementation of a first aspect of the present invention.
Figure 5:
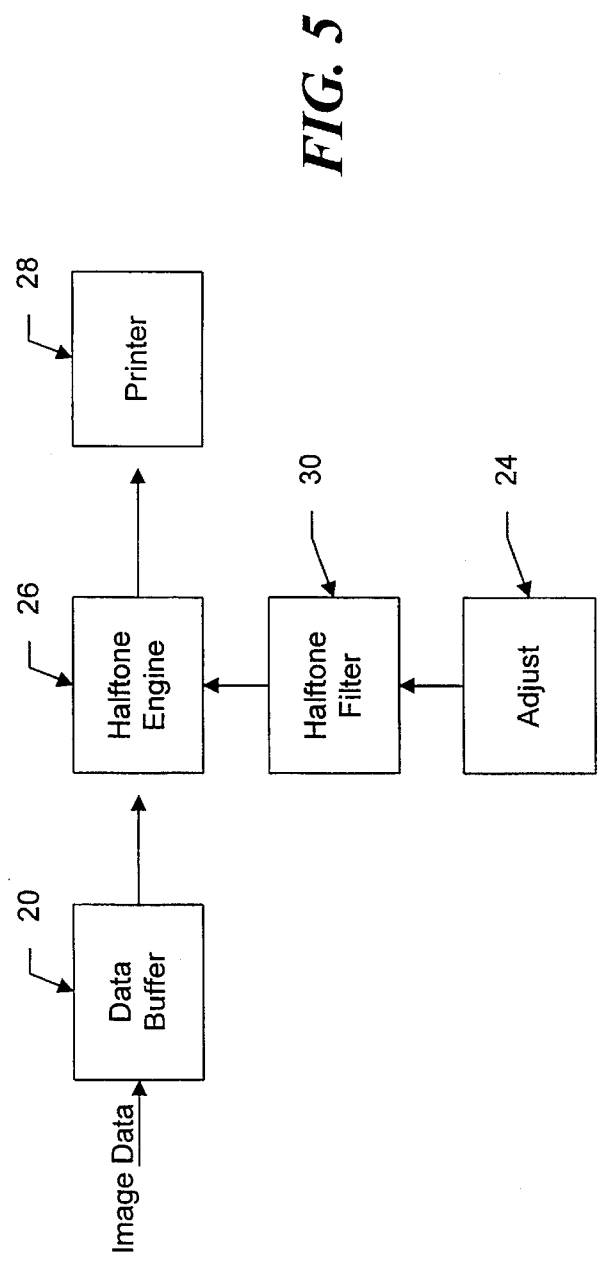
FIG. 5 illustrates, in block-diagram form, a preferred hardware implementation of a second aspect of the present invention.

A representative hardware implementation of this aspect of the invention appears in FIG. 4. As shown in that figure, multibit image data (arriving, for example, from a digital scanner that samples the density of a source document in discrete steps and over a fixed range of gray-scale values) arrives as a stream of N-bit values and accumulates in a data buffer 20. The N-bit data is transferred to a filter 22, which modifies each N-bit density value according to the transform function described above. A user-actuated adjustment feature 24, which may be in the form of a slide switch or a digitally programmable input device, imposes a selected value of the weighting factor w on the transform filter function, thereby modulating its operation.

The modified N-bit image data is transferred to a halftone engine 26, which coverts the incoming data into a raster pattern of 1-bit elements according to a suitable halftone processing algorithm. The invention is suitably used in conjunction with a variety of such algorithms, including globally fixed-level thresholding, constrained-average thresholding, dynamic thresholding, orthographic tone-scale creation, so-called electronic screening algorithms, various dithering algorithms (including ordered dither techniques such as dispersed-dot dithering) and error-diffusion techniques.

The above-described form of filter function, which operates on the printer function, cannot be used with printer functions symmetrical with respect to the filter function, since application of the filter function would not produce the desired S-shaped, asymmetric output function $h(x)$. For example, the above formulation of $g(x)$ cannot be used in conjunction with clustered-dot dithering halftone algorithms, which result in printer functions symmetrical with respect to $h(x)$. However, it is possible to utilize alternative mathematical constructs to produce the desired output function.

The raster output of halftone engine 26 is delivered to a conventional electronic printer 28, which applies ink or toner to a recording medium in accordance with the raster pattern.

The second aspect of the invention, in which the halftone algorithm is filtered instead of the image data, may be practiced in accordance with the hardware implementation illustrated in FIG. 4. In this case, a halftone filter 30 modifies halftone engine 26 such that the final halftone output is biased in accordance with the function $g(x)$.

This aspect of the invention is most advantageously applied to array-based halftoning techniques that apply a predetermined (or slowly changing) series of values to incoming source data. The approach is therefore of particular use in conjunction with dithering arrangements. In accordance with this aspect of the invention, each array value is treated as a discrete intensity level, and a filter function applied thereto to obtain modified values. Because the array values represent (or translate into) thresholds rather than intensities, the inverse function $g^{-1}(x)$, rather than $g(x)$, is applied to the array values. Halftoning engine 26 applies the filtered dither array to incoming source data as described above.

Figure 3A:
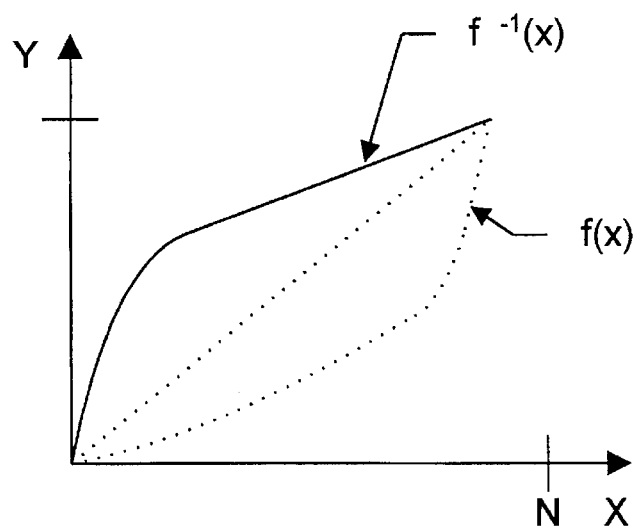
FIGS. 3A and 3B graphically illustrate derivation of a parameterized family of transfer functions adapted for use with a dither array.
Figure 3B:
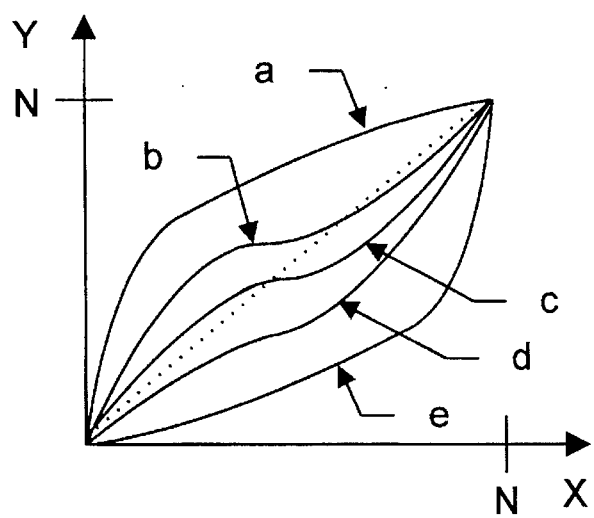

Application of this technique is shown in FIGS. 3A and 3B. Since printed output densities of the printer follow the typical $f(x)$ pattern, the dither array threshold values, to which source data are compared, are generally arranged to reflect an opposite inherent bias $f^{-1}(x)$; in this way, when the comparison between input source data and dither-array threshold values is made, the overall output density will be approximately the same as the input density. In order to obtain an ultimate printed output, following dithering, that adheres to the desired $f(g(x))$ pattern (i.e., application of the earlier-described function $g(x)$ to input source data), the values in the dither array are biased in accordance with the inverse function $g^{-1}(x)=N-f^{-1}(N-x)$ to produce curve c in FIG. 3B; this curve is inverse to the desired output curve, to which the final image conforms as a result of thresholding against the inversely biased array values.

Once again, it is desirable to provide for adjustment of the transform function $g^{-1}(x)$ so that the user may select the degree of density modification to suit particular conditions. This is accomplished with the adjustment feature 24, which again applies the weight w to obtain a family of available transform functions:

$$g^{-1}(x)=x-2w[x-N+f^{-1}(N-x)]$$

where $0<w<1$. Representative curves in accordance with this function are illustrated in FIG. 3B. Once again, curve c illustrates the case $w=0.5$, which produces an ultimate output $f(g(x))$. Curve a corresponds to $w=0$, which reflects no dither modification; curve e produces an ultimate output equivalent to the $g(x)$ function; and curves b and d represent intermediate cases.

As noted above, the values in the modified dither array may be directly compared with the source data values as halftone thresholds that determine whether corresponding raster points are to be colored or uncolored; or the dither array may instead be tiled onto those values on an iterative basis, augmenting the density value of each source pixel by the value of the applied dither array cell prior to comparison with a fixed threshold.

Figure 6:
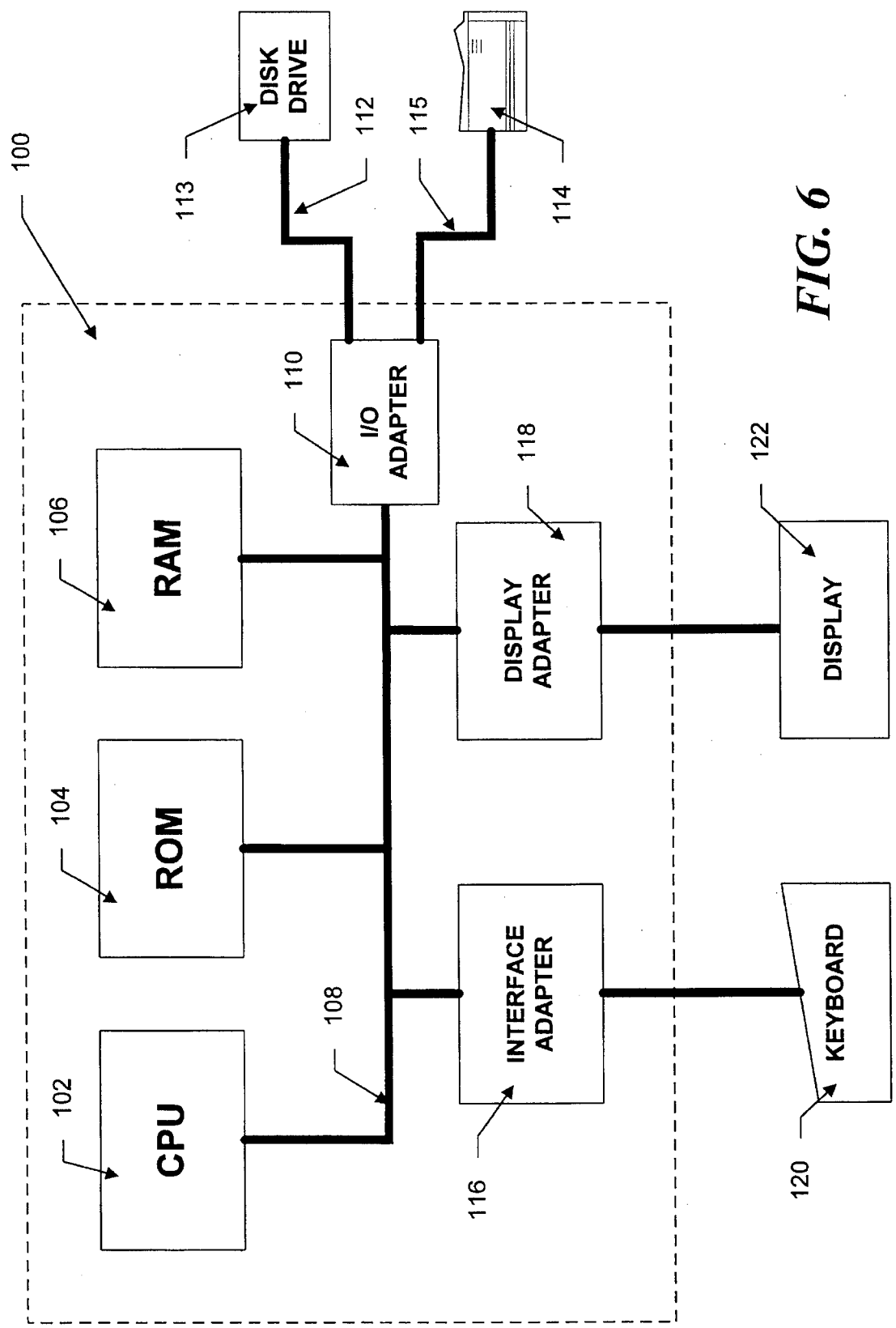
FIG. 6 illustrates, in block-diagram form, a computer system incorporating the present invention.

The invention is preferably practiced in the context of a computer system such as the IBM PS/2 or Apple Macintosh computer. A representative environment is depicted in FIG. 6, and includes a computer 100 controlled by a central processing unit 102, which may be a conventional microprocessor. A number of other additional units, all interconnected via a system bus 108, are provided to accomplish specific tasks. Although a particular computer system may have only some of the units illustrated in FIG. 6 or may have additional components not shown, most computers will include at least the units shown.

Computer 100 includes a random access memory (RAM) 106 for temporary storage of information, a read only memory (ROM) 104 for permanent storage of the computer's configuration and basic operating commands, and an input/output (I/O) adapter 110 for connecting peripheral devices such as a disk unit 113 and printer 114 to bus 108, via cables 115 and 112, respectively. A user interface adapter 116 is also provided for connecting input devices, such as a keyboard 120, as well as other known interface devices such as mice, speakers and microphones, to bus 108. Visual output is provided by a display adapter 118, which connects bus 108 to a display device 122 such as a video monitor. Computer 100 has resident thereon and is controlled and coordinated by a suitable operating system.

Most relevant to the present invention is printer 114, which typically accepts image, graphic and/or text information from an application program (such as a text editor or image processor) resident in RAM 106. Control of printer 100, including halftoning operations and the filtering operations of the present invention, may be carried out by suitable software modules resident in computer 100 or in printer 114 itself. Generically known as "drivers," these modules process raw image, graphic and/or text information from the computer system into a form suitable for directly controlling the printing element(s). The present invention is amenable to implementation in the form of printer drivers or, as discussed above, in the form of hardware that directly implements the described functions.

It will therefore be seen that the foregoing represents a useful and efficient approach to preprocessing of image or halftone data prior to electronic printing. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of printing comprising:
   a. obtaining data representative of density levels associated with a source image;
   b. filtering the data in accordance with a filter function;
   c. processing the filtered data into a halftone pattern; and
   d. printing in accordance with the halftone pattern onto a recording medium,
   wherein the filter function is defined such when the halftone pattern is printed, the printed pattern exhibits a density pattern lighter than that of the source image in highlight and upper midtone regions and darker than that of the source image in shadow and lower midtone regions.

2. The method of claim 1 wherein the printing step is carried out with an electronic printer having a printer transfer function $f(x)$ and the filter function is $g(x)=N-f(N-x)$, where x is the density of a source data point and N is the highest gray-scale density at which the source data is represented.

3. The method of claim 1 wherein the printing step is carried out with an electronic printer having a printer transfer function $f(x)$ and the filter function is $g(x)=2w[N-f(N-x)-x]+x$, where x is the density of a source data point, N is the highest gray-scale density at which the source data is represented, and $0 \leq w \leq 1$, and further comprising the step of selecting a suitable value of w.

4. The method of claim 1 wherein the processing step is accomplished by error diffusion.

5. The method of claim 1 wherein the processing step is accomplished by dithering.

6. The method of claim 5 wherein the processing step is accomplished by dispersed-dot dithering.

7. The method of claim 5 wherein the halftone-processing step comprises the steps of:
   a. associating each source datum with a binary raster point;
   b. applying a dither array to the source data;
   c. comparing the dithered data to a pixel threshold value; and
   d. selecting raster-point values based on whether corresponding dithered source data exceed the threshold.

8. The method of claim 5 wherein the halftone-processing step comprises the steps of:
   a. associating each source datum with a binary raster point;
   b. sequentially comparing the source data to numerical values in a dither array; and
   c. selecting raster-point values based on whether corresponding source data exceed the array values.

9. The method of claim 1 wherein the processing step comprises the steps of:
   a. providing a dither array comprising a plurality of cells, each associated with a numerical value;
   b. associating each source datum with a binary raster point;
   c. modifying the cell values in accordance with a biasing function;
   d. applying the dither array to the source data by sequentially comparing the density values of the source data to values of cells of the dither array; and
   e. selecting raster-point values based on whether corresponding source-data values exceed the value of the array cells to which they are compared.

10. The method of claim 1 wherein the processing step comprises the steps of:
    a. associating each source datum with a binary raster point;
    b. providing a dither array comprising a plurality of cells, each associated with a numerical value;
    c. modifying the cell values in accordance with a biasing function;
    d. applying the dither array to the source data by adding the value of an array cell to each source datum;
    e. comparing the dithered source data to a pixel threshold value; and
    f. selecting raster-point values based on whether corresponding source-data values, which have been augmented by the array-cell values, exceed a fixed threshold.

11. The method of claim 9 wherein the biasing function is $g^{-1}(x)=N-f^{-1}(N-x)$, where x is the density of a source data point and N is the highest gray-scale density at which the source data is represented.

12. The method of claim 10 wherein the biasing function is $g^{-1}(x)=N-f^{-1}(N-x)$, where x is the density of a source data point and N is the highest gray-scale density at which the source data is represented.

13. The method of claim 9 wherein the biasing function is $g^{-1}(x)=x-2w[x-N+f^{-1}(N-x)]$, where x is the density of a source data point, N is the highest gray-scale density at which the source data is represented, and $0 \leq w \leq 1$, and further comprising the step of selecting a suitable value of w.

14. The method of claim 10 wherein the biasing function is $g^{-1}(x)=x-2w[x-N+f^{-1}(N-x)]$, where x is the density of a source data point, N is the highest gray-scale density at which the source data is represented, and $0 \leq w \leq 1$, and further comprising the step of selecting a suitable value of w.

15. Printing apparatus comprising:
    a. a source of electronically encoded data representative of density levels associated with a source image;
    b. a filter for modifying the data in accordance with a filter function;
    c. a halftone engine for processing the modified data into a halftone pattern; and
    d. means for applying ink or toner to a recording medium forming an output in accordance with the halftone pattern,
    wherein the filter function is defined such that the output exhibits a density pattern lighter than that of the source image in highlight and upper midtone regions and darker than that of the source image in shadow and lower midtone regions.

16. The apparatus of of claim 15 wherein the printing apparatus has a characteristic printer transfer function $f(x)$ and the filter function is $g(x)=N-f(N-x)$, where x is the density of a source data point and N is the highest gray-scale density at which the source data is represented.

17. The apparatus of claim 15 wherein the printing apparatus has a characteristic printer transfer function $f(x)$ and the filter function is $g(x)=2w[N-f(N-x)-x]+x$, where x is the density of a source data point, N is the highest gray-scale density at which the source data is represented, and $0 \leq w \leq 1$, and further comprising means for selecting a suitable value of w.

18. The apparatus of of claim 15 wherein the halftone engine operates by means of error diffusion.

19. The apparatus of claim 15 wherein the halftone engine operates by means of dithering.

20. The apparatus of claim 19 wherein the halftone engine operates by dispersed-dot dithering.

21. Printing apparatus comprising:
    a. a source of electronically encoded data representative of density levels associated with a source image;
    b. a halftone engine having a filter characteristic for processing the data into a raster pattern; and
    c. means for applying ink or toner to a recording medium forming an output in accordance with the halftone pattern,
    wherein the filter characteristic is defined such that the output exhibits a density pattern lighter than that of the source image in highlight and upper midtone regions and darker than that of the source image in shadow and lower midtone regions.

22. The apparatus of claim 21 wherein the halftone engine is biased according to the function $g^{-1}(x)=N-f^{-1}(N-x)$, where x is the density of a source data point and N is the highest gray-scale density at which the source data is represented, to produce the density pattern.

23. The apparatus of claim 21 wherein the halftone engine is biased according to $g^{-1}(x)=x-2w[x-N+f^{-1}(N-x)]$, where x is the density of a source data point, N is the highest gray-scale density at which the source data is represented, and $0 \leq w \leq 1$, and further comprising means for selecting a suitable value of w.

24. A method of printing comprising:
    a. obtaining data representative of density levels associated with a source image;
    b. filtering the data in accordance with a filter function;
    c. processing the filtered data into a halftone pattern, and
    d. printing in accordance with the halftone pattern onto a recording medium regions,
    wherein the filter function is defined such that when the halftone pattern is printed, the printed pattern exhibits a density pattern lighter than that of the source image in highlight and upper midtone regions and darker than that of the source image in shadow and lower midtone, and
    wherein the printing step is carried out with an electronic printer having a printer transfer function $f(x)$ and the filter function is $g(x)=N-f(N-x)$, where x is the density of a source data point and N is the highest gray-scale density at which the source data is represented.

25. Printing apparatus comprising:
    a. a source of electronically encoded data representative of density levels associated with a source image;
    b. a filter for modifying the data in accordance with a filter function;
    c. a halftone engine for processing the modified data into a halftone pattern; and
    d. means for applying ink or toner to a recording medium to form an output in accordance with the halftone pattern,
    wherein the filter function is defined such that the output exhibits a density pattern lighter than that of the source image in highlight and upper midtone regions and darker than that of the source image in shadow and lower midtone regions, and
    wherein said means for applying ink or toner has a characteristic printer transfer function $f(x)$ and the filter function is $g(x)=N-f(N-x)$, where x is the density of a source data point and N is the highest gray-scale density at which the source data is represented.

26. Printing apparatus comprising:
    a. a source of electronically encoded data representative of density levels associated with a source image;
    b. a halftone engine for processing the data into a raster pattern representative of a density pattern having a filter characteristic; and
    c. means for applying ink or toner to a recording medium to form an output in accordance with the halftone pattern,
    wherein the filter characteristic is defined such the output exhibits a density pattern lighter than that of the source image in highlight and upper midtone regions and darker than that of the source image in shadow and lower midtone regions, and
    wherein the halftone engine is biased according to the function $g^{-1}(x)=N-f^1(N-x)$, where x is the density of a source data point and N is the highest gray-scale density at which the source data is represented, to produce the density pattern.

* * * * *